Aug. 8, 1961          A. PITNER          2,995,406
CLUTCH THRUST BEARING AND DEVICE EQUIPPED WITH THE LATTER
Filed July 7, 1958          2 Sheets-Sheet 1
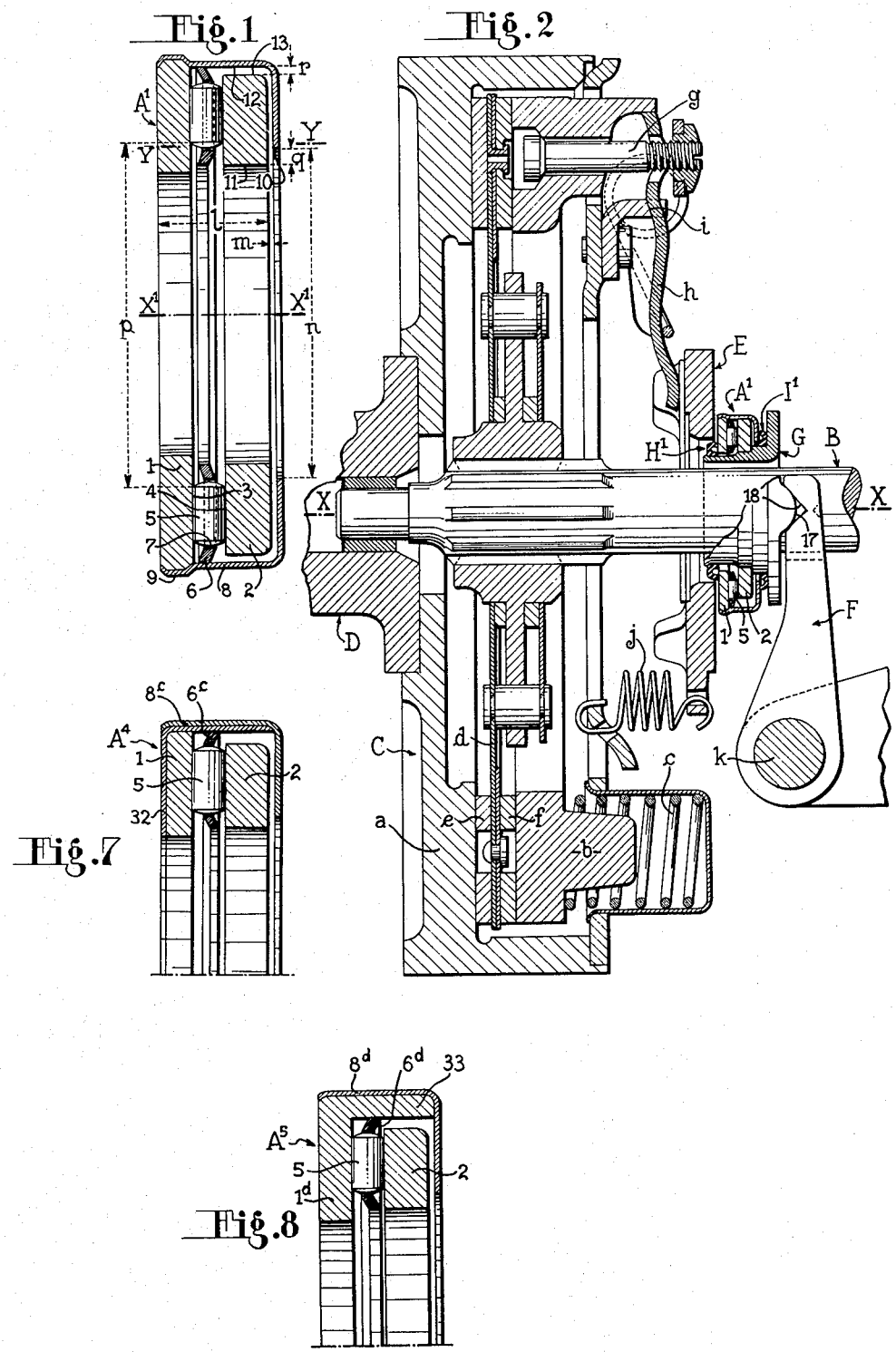

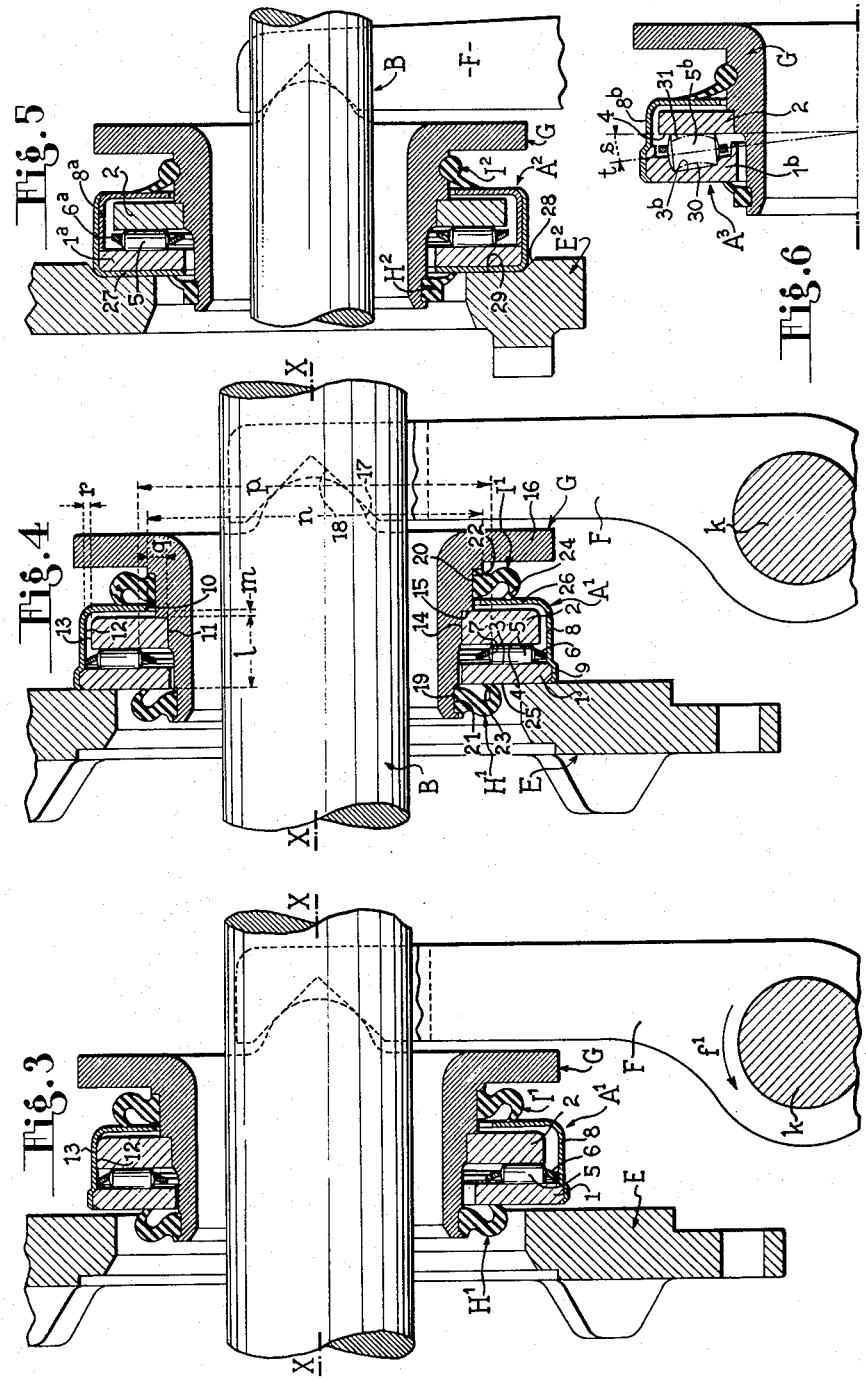

United States Patent Office 2,995,406
Patented Aug. 8, 1961

2,995,406
CLUTCH THRUST BEARING AND DEVICE
EQUIPPED WITH THE LATTER
Alfred Pitner, Paris, France, assignor of one-half to Societe Anonyme des Roulements a Aiguilles, Rueil-Malmaison, France, a corporation of France
Filed July 7, 1958, Ser. No. 747,072
Claims priority, application France July 8, 1957
2 Claims. (Cl. 308—234)

The present invention relates to clutch thrust bearings or thrust means and, more particularly, to thrust bearings which are utilized in clutch control and are of the type in which two plates or other annular members provide rolling surfaces in facing relation for moving elements disposed between said plates.

In general, thrust bearings of known type—and this is particularly so in the type in which the rolling elements consist of balls rolling on toric races or rolling surfaces—have the disadvantage of allowing no relative radial movement between the two races, since otherwise this relative radial movement would result in a large non-permissible variation in the axial thickness of the thrust bearing and the creation of obliquity between the outer faces of the thrust bearing. Thus, in known clutch control units, additional members are provided for centering and guiding the thrust bearing so that the various bearing faces remain perpendicular to the axis of the thrust bearing and the rotating members remain concentric thereby avoiding stresses due to a component perpendicular to said axis.

The object of the invention is to provide a clutch thrust bearing of the aforementioned type so improved as to avoid these disadvantages, this thrust bearing being capable of being mounted floating in the clutch control device without auxiliary guiding and centering means.

These results are obtained due to the fact that, on the one hand, the arrangement of the moving elements constituted by rollers, rolling needles or the like, and the co-operating rolling surfaces of races formed on the plates, is such that a relative radial movement between the plates causes substantially no variation in the effective axial thickness of the thrust bearing and, on the other hand, said plates are combined with means constituting a cap which limits the relative axial and radial movements of the plates and which is rigid as concerns rotation with one of the plates and extends radially along the other plate from the periphery of the latter so as to retain the last-mentioned plate axially and form at the same time an annular cavity which retains lubricant and is open toward the axis of said other plate.

As will be understood, said two plates are capable of movement, notably in the radial direction, within the limit permitted by the cap means without this causing a substantial variation in the thickness of the thrust bearing. Said moving elements are furthermore perfectly lubricated and, in these conditions, to permit a perfectly correct operation of the thrust bearing it is necessary and sufficient that the whole of the thrust bearing be held with very great freedom by the plate receiving the axial clutch control force.

Another object of the invention is to provide a clutch control device comprising the aforementioned improved clutch thrust bearing, said control device being so improved as to increase the fluid-tightness of the annular cavity formed by the cap means and filled with lubricant.

Said control device comprises in combination with said thrust bearing: a thrust means which is coaxial with said thrust bearing, extends through said two plates or other annular members and bears by a bearing face perpendicular to the axis of the thrust bearing, against the plate partly covered by the cap means, and two sealing rings fixed on said thrust means on either side of the thrust bearing and resting by means of a simple elastic sliding contact against the lateral outer faces of the thrust bearing so as not to interfere with the relative radial movements.

Owing to these rings, the fluid-tightness of the housing formed in the thrust bearing is ensured in the direction from the interior toward the exterior of the thrust bearing and inversely and even when the thrust bearing is stationary, when centrifugal force no longer acts for maintaining the lubricant in the annular cavity formed by the cap means beyond the inner peripheral edge of the latter.

Another object of the invention is to provide a unit comprising a clutch mechanism and the aforementioned control device for actuating said mechanism.

Further features and advantages of the invention will be apparent from the ensuing description, with reference to the accompanying drawings, to which the invention is in no way restricted.

In the drawings:

FIG. 1 is a diametral axial sectional view of a thrust bearing embodying the invention;

FIG. 2 is a diametral axial view, partly in elevation, of a clutch and a control device provided with the thrust bearing shown in FIG. 1 which is in place on a shaft driven by the clutch and disposed between the latter and the clutch disengaging fork;

FIG. 3 is a sectional view, on an enlarged scale, of a control device in its inoperative or clutch engagement position;

FIG. 4 is a view similar to FIG. 3 of the control device in the course of operation and after an automatic centering of the thrust bearing;

FIG. 5 is a sectional view similar to FIG. 3 of a modification of the control device;

FIG. 6 is a partial radial sectional view of another modification of the control device, and FIGS. 7 and 8 are radial sectional views of two other thrust bearings embodying the invention.

FIG. 1 shows a clutch thrust bearing or means $A^1$ improved in accordance with the invention. In this embodiment, the thrust bearing comprises two annular plates 1 and 2 which form annular rolling surfaces or races 3 and 4 in facing relation for needles 5 or like rolling elements.

The rolling surface 4 and, in the presently-described embodiment, the whole of the plate 2 have a common axis $X^1$—$X^1$, whereas the surface 3 and the plate 1 have a common axis which is parallel with the axis $X^1$—$X^1$ but movable relative to the latter.

The surfaces 3 and 4 and the elements 5 are such that the plates 1 and 2 are capable of movement relative to one another in any radial direction and in particular in the vertical direction, assuming the thrust bearing is so positioned that the axis X—X of the plate 2 is horizontal. Further, during these relative radial movements, the total effective axial thickness 1 of the thrust bearing remains substantially unchanged.

In the presently-described embodiment, the needles 5 are cylindrical or very slightly cambered and the surfaces 3 and 4 are flat or plane (or very slightly cambered) and perpendicular to the axis $X^1$—$X^1$. Although this embodiment is the simplest arrangement, the invention is not limited thereto, as will be clear hereinafter.

The elements 5 are held in position relative to one another in the circumferential direction by a cage 6 constituted by a thin annular member, preferably obtained by a press forming operation which increases rigidity, and its concave side faces the plate 1. The cage 6 comprises apertures 7 and freely disposed in all or only some of these apertures are the elements 5, one element being disposed in each aperture. If all the apertures are not occupied by an element, the empty apertures lighten the cage and increase the space available for the lubricant adapted to lubricate the elements 5 and their rolling surfaces 3 and 4 in a permanent manner.

If desired, the cage 6 could be designed to form with the elements 5 a sub-assembly, said cage being in this case adapted to prevent in the known manner the elements from falling out of the cage in at least one of the axial directions.

The assembly consisting of the two plates 1 and 2 and the elements 5 retained by the cage 6 is surrounded by cap means 8 which is carried by the plate 1 to which it is rendered rigid by a forming-over operation at 9 or in any other way, which ensures notably the axial and radial self-retaining relation between the plates 2 and 1, with the clearances mentioned hereinafter.

This cap means limits the axial relative movement of the two plates since it covers the plate 2, with an axial clearance $m$, from the periphery of this plate over a certain radial distance. The inner peripheral edge 10 of the cap means has a diameter $n$ at the most equal to, and preferably less than, the diameter $p$ of the circumference on which the rolling points of the elements 5 nearest to the axis are situated. Further, when the plates 1 and 2 are co-axial relative to the axis $X_1$—$X_1$, the peripheral edge 10 is offset outwardly relative to the inner face 11 of the plate 2 a distance $q$ which is sufficient to permit radial movements of the plate 1 and cap means 8— which latter is connected to the plate 1—relative to the plate 2 and to exert on the latter the axial clutch disengaging thrust.

In this co-axial position of the plates 1 and 2 there is a radial clearance $r$ between the inner face 12 of the cap means 8 and the outer face 13 of the plate 2 which permits their relative radial movements. The faces 12 and 13 are such that when they come into contact at the end of clutch disengagement or cease to be in contact at the start of clutch engagement, as will be explained hereinafter, the friction between these two faces is as small as possible and there is no danger of wear of these faces, considering that they are covered with a lubricant filling the cap means 8 up to the vicinity of the inner edge 10. These faces are for example made cylindrical, as shown, so as to be as large as possible. They could, furthermore, have their surfaces treated in any appropriate manner, so as to improve their resistance to frictional wear; for example these surfaces could undergo a treatment of phosphating, nitriding of cementing, which results in the formation on the surface of compounds containing at least one substance selected from the group consisting of phosphorus, sulphur, carbon and nitrogen.

As mentioned hereinbefore, the annular cavity formed by the cap means 8 and the plate 1 contains lubricant, not shown in the drawing, which is such that the ring of this lubricant formed by the effect of centrifugal force when the sub-assembly 1, 5, 6, 8 centered on the axis $X^1$—$X^1$ rotates about the latter, has an inner surface which has a generatrix $Y$—$Y$ parallel with the axis $X^1$—$X^1$ and whose diameter is between the diameters $n$ and $p$ so that the lements 5 are entirely lubricated by this lubricant. The latter could consist, for example, of a mixed soap of calcium and sodium having a drop point of about 150° C. and permitting extreme operational temperatures of between —40° C and +120° C.

FIGS. 2, 3 and 4 show a clutch control thrust bearing $A^1$ freely mounted on the driven shaft B that a conventional clutch device C having an axis X—X is adapted to connect to a driving shaft D (FIG. 2).

This clutch is for example of the type having a plate $a$ rigid with the driving shaft D and an annular pressure plate or counter-plate $b$ biased by springs $c$. The latter cause a clutch plate $d$ fixed on the driven shaft B to be gripped between friction linings $e$ and $f$ mounted on the plates $a$ and $b$.

The clutch is disengaged by moving the plate $b$ toward the right, as viewed in FIG. 2, by means of pins $g$ and levers $h$ which are pivotably mounted at $i$ and against which bears a thrust plate E. The latter is fixed to the plate $a$ of the clutch in an elastically yieldable manner by springs $j$.

The trust bearing $A^1$ is disposed between the plate E and a clutch fork F which is rigid through the medium of its pivot pin $k$ with a pedal or other clutch disengaging or control member (not shown in the drawings) combined with a return spring for returning the pedal to its inoperative position.

The thrust bearing $A^1$ is therefore adapted to transmit to the plate E an axial thrust exerted by the fork F toward the left as viewed in FIG 2.

The thrust bearing $A^1$ is mounted on a thrust means G adapted to be interposed between the fork F and the bearing $A^1$. The thrust means G is an annular body of revolution about an axis and comprises in its outer face a bearing face 14 adjacent to a shoulder 15 on which and against which is centered in abutting relation the plate 2 and, at a certain axial distance from the shoulder 15, a flange 16 whose outer face is provided with two bosses 17 on which bear recesses 18 formed in the branches of the fork F.

The thrust means G carries on either side of the bearing $A^1$ two sealing rings $H^1$ and $I^1$ each of which comprises a heel portion 19 or 20 (FIG. 4)—the heel 19 being engaged in a recess 21 in the thrust means G and the heel 20 engaged in a bearing face 22 in the thrust means G—and an outer peripheral lip 23 or 24. The lips 23 and 24 respectively bear against the outer faces 25 and 26 of the plate 1 and cap means 8 against which faces these lips are capable of slipping without ceasing to provide a seal in the outward and inward direction relative to the axis X—X when the control device (E, $A^1$, G, F) of the clutch C is operative or inoperative.

The unit just described operates in the following manner:

When the clutch control device is in its inoperative position, that is when the clutch is engaged, the various elements of the unit are in the position shown in FIGS. 2 and 3. The fork F is biased by its conventional return spring (not shown in the drawing), the thrust means G remains held in position by its bosses 17 engaged in the recesses 18 of the fork and in turn holds the plate 2 in position. On the other hand, the plate 1 is free, since it is not held against the plate E and, owing to the effect of gravity, the plate 1, the cap means, the cage 6 and the rolling elements 5, are in an eccentric position relative to the axis X—X of the clutch and relative to the axis of the plate 2 (axis $X^1$—$X^1$ shown in FIG. 1) which coincides substantially with the axis X—X. The off-center or eccentric position of the assembly (1, 5, 6, 8) is determined by the bearing of the inner face 12 of the cap means 8 (see FIG. 3) against the top of the peripheral face 13 of the plate 2, the radial distance $q$ (FIG. 4) between the inner edge 10 of the cap means 8 and the face 11 of the plate 2 being such that the radial clearance between the edge 10 and the bearing surface 22 of the thrust means G is not wholly taken up (see FIG. 3).

In the position shown in FIGS. 2 and 3, the sealing rings $H^1$ and $I^1$ perform their function perfectly well. They prevent any possible flow of the lubricant out of the clutch bearing $A^1$ and any entrance of dust or other exterior bodies on or surrounding the peripheral lips 23 and 24.

For this inoperative position of the clutch fork F the driven shaft B is, then, normally engaged with the driving shaft D by the clutch C.

When it is desired to disengage the clutch, the fork F is pivoted in the direction of arrow $f^1$ (FIG. 3). This fork exerts in the direction toward the left, as viewed in FIG. 3, an axial thrust on the thrust means G which the latter transmits to the bearing $A^1$. The latter rapidly bears against the rotating thrust plate E and the subassembly comprising the plate 1, the cap means 8, the cage 6 and the needles 5, rotates relative to the plate 2 about an axis which is initially eccentric relative to the axis X—X of the clutch, but, owing to an advantage of the thrust bearing of the invention resulting from the possibility of radial movements of one of the plates relative to the other, this thrust bearing provides a self-centering effect relative to the axis X—X. As a result of a simultaneous thrust on all of the elements 5 the latter automatically center themselves about the instantaneous axis of rotation. These elements 5 act, through the medium of the cage 6 in which they are centered, on the plate 1, relative to which latter the cage 6 is itself held in position, and ensure that the plate 1 and the cap means 8 have a correctly centered position relative to the instantaneous axis of rotation. The various members and elements of the units, which in the inoperative position of the clutch fork, assumed under the effect of gravity or any other force the positions shown in FIG. 3, finally assume the positions shown in FIG. 4.

This self-centering effect permits maintaining (FIG. 4) the outer face 13 of the plate 2 separated from the inner face 12 of the cap means 8, so that in the course of operation or clutch actuation the undesirable inner sliding friction between these faces is eliminated. In this way heating and wear, and in consequence any deterioration of the lubricant, is avoided.

When the clutch fork F returns to its inoperative position (clutch engagement), owing to the progressive decrease in the rotational speed, the aforementioned eccentricity once again occurs and the faces 12 and 13 having smooth rubbing surfaces then come progressively and gently in contact with one another until the members of the thrust bearing stop moving.

In the course of clutch disengagement, the cap means 8 rotates at high speed and dust and other foreign bodies, stopped at the periphery of the cap means by the peripheral outer lips 23 and 24 of the sealing rings, are easily expelled by the centrifugal force developed, whereas inside the cap the lubricant assumes the shape of a ring having a generatrix Y—Y, as mentioned hereinbefore.

FIG. 5 shows a modification of the thrust bearing $A^2$ in which the centering in the course of clutch disengagement is not ensured by the self-centering effect, the cage $6^a$ having a radial clearance relative to the sealing cap means, which latter in this modification is composite and consists of a cap member $8^a$ and an outer annular member 27 riveted or fixed on the plate $1^a$ and on the cap member $8^a$. The centering is ensured by exterior means constituted by a conical face 28 provided on the plate $E^2$ at the periphery of the bearing face 29 of the thrust bearing $A^2$ and in which conical face at the start of clutch disengagement, the assembly ($1^a$, $8^a$, 27) centers itself progressively but rapidly. This assembly remains slightly engaged in the face 28 when the clutch is engaged.

In this modification, the two sealing rings $H^2$, $I^2$ have shapes different to those of the rings of the first embodiment but possess the aforementioned outer peripheral lips.

FIG. 6 shows by means of a diagrammatic example that, in order to keep constant the axial thickness of the thrust bearing although the moving elements are capable of moving radially relative to one of the rolling surfaces, it is necessary and sufficient that this surface be plane and perpendicular to the axis of the thrust bearing. If the moving elements cannot move radially relative to the other surface, the latter could have any shape, on condition that it is a surface of revolution about the axis X—X.

Thus, in the thrust bearing $A^3$ shown in FIG. 6, the moving elements $5^b$ are conical. They roll along a conical surface $3^b$ on the plate $1^b$—with which latter the cap means $8^b$ is rigid—and along the plane surface 4 perpendicular to the axis X—X.

When the assembly $1^b$, $5^b$, $8^b$ undergoes radial movement relative to the plate 2, the effective thickness of the thrust bearing does not change.

The same would be true if the rolling surface $3^b$ formed in the plate $1^b$ had curved generatrices, as shown in dot-dash line at 30, or if the rollers or needles $5^b$ had a shape having curved generatrices, as shown in dot-dash line at 31, on the sole condition that the inclination $s$ of their axes $t$—$t$ relative to the plane surface does not change.

FIG. 7 shows a modification $A^4$ of the thrust bearing also comprising a composite device which forms the cap means and consists of a member 32 having an L-shaped axial section and surrounding the plate 1 and another member $8^c$ which has a similar cross-sectional shape but is disposed in the opposite direction and is riveted or fixed on the member 32. The cage $6^c$ is always centered relative to the plate 1 owing to the fact that it is engaged with the elements 5 without appreciable radial clearance within the peripheral cylindrical portion of the member 32.

FIG. 8 shows another modification $A^5$ of the thrust bearing in which the device forming the cap means consists of the combination of a cylindrical flange 33, forming part of the same material as the plate $1^d$, and a member $6^d$ fixed to the assembly ($1^d$, 33) for example by riveting.

Although specific embodiments of the invention have been described, many modifications and changes may be made therein without departing from the scope of the invention as defined in the appended claims.

If desired, the thrust plate E could be dispensed with, the thrust bearing resting directly against the lever $h$ which have preferably an involute profile.

Having now described my invention what I claim as new and desire to secure by Letters Patent is:

1. In a clutch control arrangement a clutch thrust bearing comprising in combination, a built-in race ring and a free race ring, both having annular rolling surfaces with rectilinear generatrices facing each other, a circular series of roller elements having substantially rectilinear generatrices arranged radially and interposed between said race rings for rolling along said rolling surfaces, a cage having guiding apertures accommodating said roller elements, enclosing means assembled with said built-in race ring and having a cylindrical portion extending across the periphery of said free race ring and an annular flange portion extending inwardly over the outer face of said free race ring, the channel space comprised between said built-in race ring, said cylindrical portion and said annular flange portion being adapted to contain lubricant and retain same in rotation, the outer diameter of said free race ring being less than the internal radial size of the corresponding portions of said enclosing means to such an extent that said free race ring is free to assume an eccentric position relatively to said enclosing means and said built-in race ring, the rolling surface of said free race ring being in a radial plane, whereby eccentricity thereof relatively to said built-in race ring does not alter the distance between said rolling surfaces, a thrust sleeve member extending axially through said free race ring and having a centering fit therein, and extending axially with a radial play through said built-in race ring and said cage, said thrust sleeve having a portion of larger diameter forming a thrust transmitting shoulder engaging the outer face of said free race ring, said portion of larger diameter extending with radial play through the annular flange of said enclosing means, and means for sealing the gap between said bearing and thrust member.

2. A clutch control as claimed in claim 1, wherein said sealing means comprises two annular packing members of elastic material, each having a thick central portion tightly threaded over said thrust sleeve member on the respective sides of said thrust bearing and a tapering flexible outer annular portion bearing in a fluid-tight manner on the respective outer radial face of said thrust bearing.

References Cited in the file of this patent

UNITED STATES PATENTS

| | | |
|---|---|---|
| 1,958,725 | Stein | May 15, 1934 |
| 2,029,445 | Schubert | Feb. 4, 1936 |
| 2,055,524 | Ellis | Sept. 29, 1936 |
| 2,105,932 | Ruesenberg | Jan. 18, 1938 |
| 2,310,381 | Zimmer | Feb. 9, 1943 |
| 2,569,531 | Kunzog | Oct. 2, 1951 |
| 2,818,302 | Black | Dec. 31, 1957 |